May 6, 1941.  C. J. BRISTOL  2,240,756
VIBRATORY JACK SUPPORT FOR AUTOMOBILE HOISTS
Filed May 24, 1940    2 Sheets-Sheet 1

Inventor
Cyrus J Bristol

May 6, 1941.   C. J. BRISTOL   2,240,756
VIBRATORY JACK SUPPORT FOR AUTOMOBILE HOISTS
Filed May 24, 1940   2 Sheets-Sheet 2
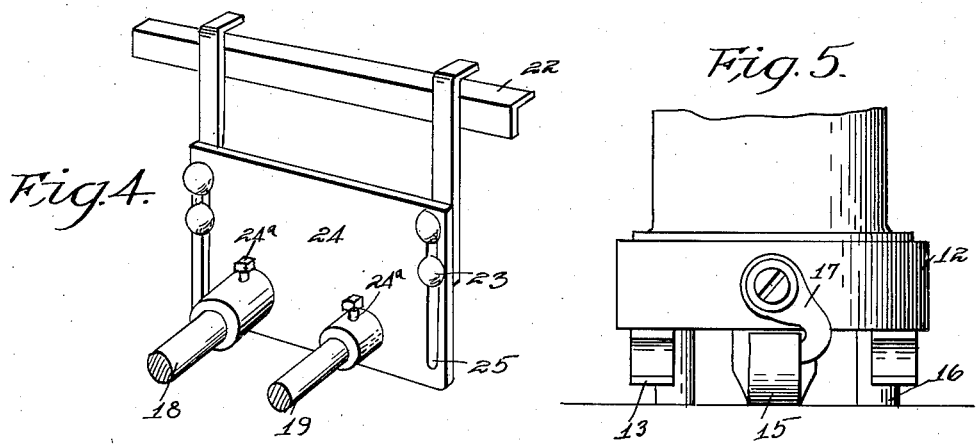
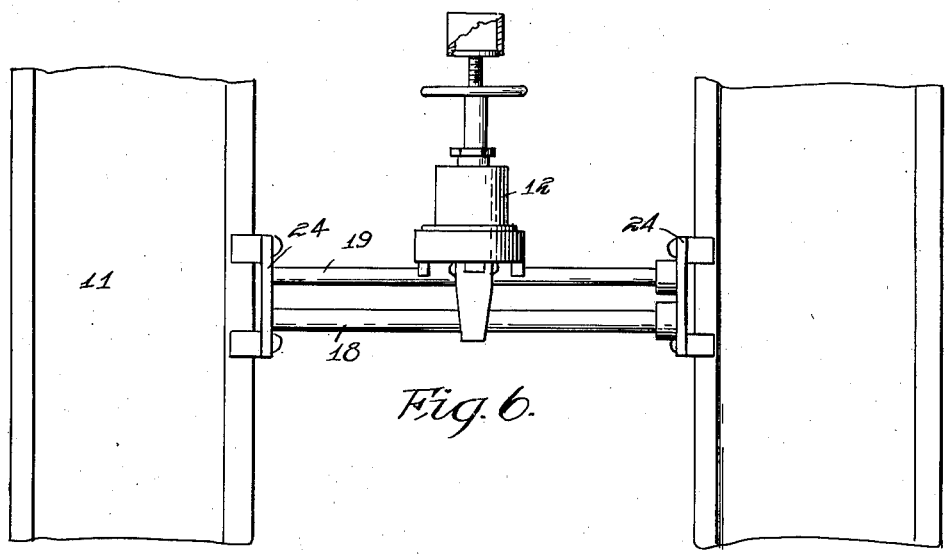
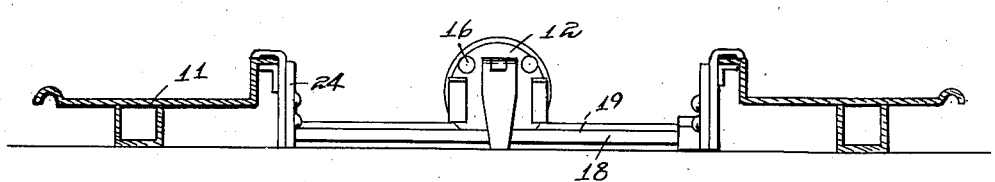
Inventor
Cyrus J. Bristol Patented May 6, 1941

2,240,756

UNITED STATES PATENT OFFICE 2,240,756

VIBRATORY JACK SUPPORT FOR AUTOMOBILE HOISTS

Cyrus J. Bristol, Des Moines, Iowa, assignor to Globe Hoist Company, Des Moines, Iowa, a corporation of Iowa Application May 24, 1940, Serial No. 337,045

11 Claims. (Cl. 254—89)

Vibratory jacks for use when lubricating automobile springs are in general use and are customarily supported on the floor and engage the under surface of an automobile frame. In many instances it is desirable to vibrate an automobile when it is supported in an elevated position on an automobile hoist.

The object of my invention is to provide a support of this class, of simple, durable and inexpensive construction, to be used in connection with such vibratory jacks and automobile hoists.

The space between the top of an automobile hoist and the under surface of an automobile frame to which the vibratory jack is to be applied is limited and varies considerably in automobiles of different kinds. One of my objects is to provide a support of this class which may be used with the ordinary vibratory jack and readily and quickly applied to any automobile.

A further object is to provide a support of this class in which the jack may be readily, quickly and easily adjusted relative to a hoist and an automobile thereon to engage any desired portion of the automobile, and also readily and easily swing from its upright position to a substantially horizontal position so that when the hoist is lowered, the jack will be free from the automobile.

A further object is to provide a support of this class in which the jack-supporting means is applied solely to the base of the jack to thereby avoid strains and stresses upon other portions thereof, and yet not in any way interfere with the ordinary use of the jack when resting upon a floor.

In the accompanying drawings—

Figure 4 shows a detail perspective view of one of the telescoping end members of the support;

Figure 5 shows a side view of the jack detached from the support and in position for use upon a floor;

Figure 6 shows a plan view of a part of a hoist having my support thereon and showing the jack in its horizontal position; and Figure 7 shows a transverse sectional view of a hoist having my support applied thereto, showing the jack in its folded position and the support in its telescoped position for occupying a minimum of space.

Figure 2:
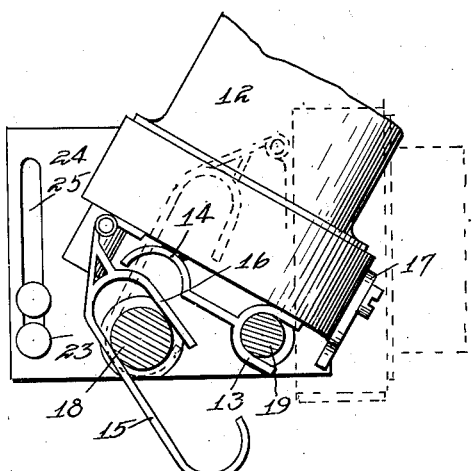
Figure 2 shows a vertical transverse sectional view of my support applied to a jack; the dotted lines show the jack-support in horizontal position.
Figure 3:
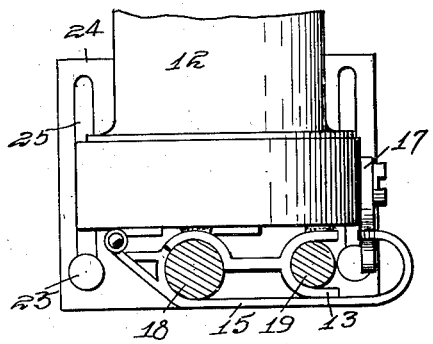
Figure 3 is a similar view showing the jack in upright position.

The portions of the automobile hoist illustrated comprise a plunger 10 and two so-called roll-on rails 11 to receive automobile wheels.

The jack is of the ordinary construction of so-called vibratory jacks, and is indicated by the reference numeral 12. On the base of the jack there are fixed two hooks 13, open at their outer sides, and an extension of each hook is formed with a recessed portion 14. On the opposite side of the base is a pivoted hook 15 and an arm 16 for purposes hereinafter made clear. The hook 15 folds up against the base of the jack between the hooks 13, and legs 16a are secured to the base of the jack to support on a floor surface without resting on the hooks. At one side of the base is a latch 17 to releasably engage the hook 15 and hold it toward the base of the jack.

The jack support comprises a main supporting bar 18 and a smaller supporting bar 19, parallel and spaced apart.

Figure 1:
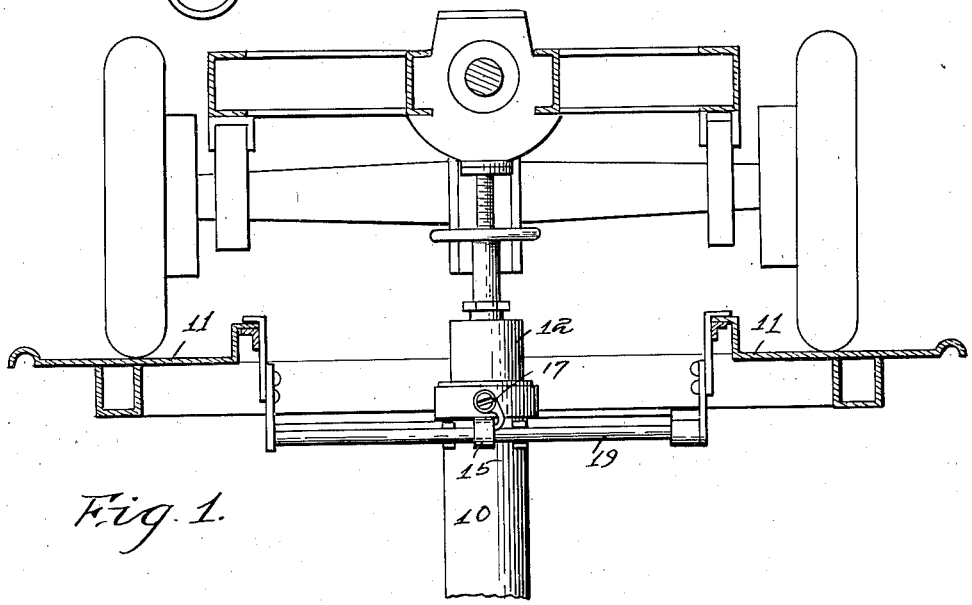
Figure 1 shows an end elevation of a hoist and part of an automobile thereon, partly in section, and my vibratory jack support applied thereto with a jack in elevated position.

At each end of the supporting bars there is a longitudinally-sliding and vertically-adjustable hanger, comprising two upright bars 20 having their upper ends extended outwardly at 21 to engage the automobile hoist rail 11 and permit longitudinal sliding movement of the hanger. Below the ends 21 is a horizontally arranged angle bar 22 to project under the edge of the automobile hoist rail, as shown in Figure 1. At the lower end of each bar 20 are two headed pins 23. The other hanger member comprises a plate 24 having vertical slots 25 through which the headed pins 23 are extended and whereby the plate 24 is permitted a limited sliding movement relative to the upper hanger member.

The bars 18 and 19 are fixed at their ends to one of the plates 24, and adjustably connected to the other plate 24 by set screws 24a.

The hooks 13 are so shaped and positioned as to pass under and partially around the bar 19, as shown in Fig. 2, and open at their outer ends so that when the jack is tilted to the position shown by dotted lines in Fig. 2 the jack may be tilted off of the bar 19 and the hooks 13 are freely slidable lengthwise on the bar 19. The hook 15 is so shaped that when the jack is tilted to position somewhat beyond the solid line position shown in Fig. 2 the hook 15 is disengaged from the bar 18 and the jack may be removed from the bars 18 and 19, and when the jack is tilted to the position shown by dotted lines in Fig. 2 the hook 15 will engage the bar 18 and prevent further tilting movement of the jack.

Obviously, the support itself is of very simple and inexpensive construction, and the parts of the device that are attached to the jack are simple and inexpensive.

In use, an automobile is driven on the hoist rails when the hoist rails are on the floor, as shown in Fig. 7. The jack is in its horizontal position so that even a low automobile will pass over it. Then the hoist is partly elevated and the lower hanger member moves downwardly relative to the upper hanger member from the position shown in Fig. 7 to that shown in Fig. 1. This provides ample room to swing a rather large jack to upright position under the car frame. Then the jack may be operated in the usual manner to lift the automobile frame relative to the automobile wheels, and thereafter the jack may be vibrated in the ordinary manner. The jack is freely slidable relative to the hoist, both laterally and longitudinally, so that any part of the automobile frame may be elevated.

When the jack is in its upright position it is held against accidental tilting movements by the latch 17.

I claim as my invention:

1. A jack support for use with automobile hoists, comprising two supporting bars, means at their ends for supporting them upon an automobile hoist, a jack, a hook secured to the base of the jack and extended under one of the supporting bars, and a second hook pivoted to the jack and shaped to engage the under surface of the other supporting rod when the jack is tilted toward horizontal position, to prevent further tilting movement thereof.

2. A jack support for use with automobile hoists, comprising two supporting bars, means at their ends for supporting them upon an automobile hoist, a jack, two hooks fixed to the under surface of the jack in spaced-apart positions at one side thereof, and shaped to engage one side and the lower surface of one of the supporting bars, and a hook pivoted to the base of the jack at the opposite side thereof and extended under the other supporting bar and having its hook positioned to engage the latter supporting bar when the jack is tilted, to prevent further tilting movement.

3. A jack support for use with automobile hoists, comprising two supporting bars, means at their ends for supporting them upon an automobile hoist, a jack, two hooks fixed to the under surface of the jack in spaced-apart positions at one side thereof, and shaped to engage one side and the lower surface of one of the supporting bars, and a hook pivoted to the base of the jack at the opposite side thereof and extended under both supporting bars and having a hook-shaped end portion to engage one of the supporting bars when the jack is tilted, to prevent further tilting movement.

4. A jack support for use with automobile hoists, comprising two supporting bars, means at their ends for supporting them upon an automobile hoist, a jack, two hooks fixed to the under surface of the jack in spaced-apart positions at one side thereof, and shaped to engage one side and the lower surface of one of the supporting bars, and a hook pivoted to the base of the jack at the opposite side thereof and extended under both supporting bars and having a hook-shaped end portion to engage one of the supporting bars when the jack is tilted, to prevent further tilting movement, and legs for the base extended below said hooks.

5. A jack-supporting device for automobile hoists, comprising two supporting bars, a hanger member fixed to each end of both bars, a co-acting hanger member for each of said hanger members shaped to be supported upon the rails of an automobile hoist and to extend downwardly therefrom, and means for permitting a limited sliding movement of the hanger members relative to each other.

6. A jack-supporting device for automobile hoists, comprising two supporting bars, a hanger member fixed to each end of both bars, a co-acting hanger member for each of said hanger members shaped to be supported upon the rails of an automobile hoist and to extend downwardly therefrom, and means for permitting a limited sliding movement of the hanger members relative to each other, said means comprising vertical slots formed in one of the hanger members and guide pins fixed to the other member and extended through said slots.

7. A jack and support therefor for automobile hoists, comprising two hanger members shaped to be slidingly supported on the automobile supporting rails of a hoist, a co-acting hanger member having limited vertical sliding movement with each of said first mentioned hanger members, supporting bars fixed to and extended across between said latter hanger members, a jack, means for slidingly supporting the jack upon the bars for movement lengthwise of the bars, and means for limiting lateral tilting movement of the jack relative to the bars.

8. A jack and support therefor for automobile hoists, comprising two hangers each having two upright hanger members having their upper ends extended outwardly to overlap the rails of an automobile hoist, a longitudinally extended bar fixed to each of the hanger members and extended outwardly and spaced below the upper ends of the hanger member, two headed guide pins fixed to the lower ends of said hanger members, a lower hanger member formed with upright slots to receive said pins, two jack-supporting bars arranged horizontally and parallel to each other and fixed at their ends to the lower hanger members, a jack, a hook fixed to the base of the jack to pass under one of the bars and open at its outer side for removal from the bar for slidingly and pivotally connecting the jack to the bar, and a second hook pivoted to the base of the jack to engage the other supporting bar when the jack has been tilted laterally relative to the bars.

9. A jack support for use with automobile hoists, comprising two supporting bars, means at their ends for supporting them upon an automobile hoist, a jack, a hook secured to the base of the jack and extended under one of the supporting bars, a second hook pivoted to the jack and shaped to engage the under surface of the other supporting rod when the jack is tilted toward horizontal position, to prevent further tilting movement thereof, and a latch pivoted to the jack for engaging the pivoted hook to prevent tilting movement of the jack.

10. A jack and support therefor, comprising a jack, a supporting bar, means for detachably securing the supporting bar to an automobile hoist, means applied to the jack for pivotally connecting it to the bar to swing at right angles to the bar, and means for limiting said tilting movement.

11. A jack and support therefor, comprising a jack, a supporting bar, means for detachably securing the supporting bar to an automobile hoist, means applied to the jack for pivotally connecting it to the bar to swing at right angles to the bar, and means for limiting said tilting movement, said means comprising a hook pivoted to the base of the jack to be engaged by the hook when the jack is tilted.

CYRUS J. BRISTOL.